United States Patent [19]

Cozewith et al.

[11] Patent Number: 5,030,695

[45] Date of Patent: Jul. 9, 1991

[54] END-CAPPED POLYMER CHAINS, STAR AND GRAFT COPOLYMERS, AND PROCESS OF MAKING SAME

[75] Inventors: Charles Cozewith, Westfield; Shiaw Ju, Edison; Gary W. Verstrate, Matawan, all of N.J.

[73] Assignee: Exxon Research & Engineering Company, Linden, N.J.

[21] Appl. No.: 242,821

[22] Filed: Sep. 12, 1988

Related U.S. Application Data

[63] Continuation of Ser. No. 813,848, Dec. 27, 1985, abandoned, which is a continuation-in-part of Ser. No. 813,511, Dec. 26, 1985, Pat. No. 4,882,406, which is a continuation-in-part of Ser. No. 681,950, Dec. 14, 1984, Pat. No. 4,652,887, which is a continuation-in-part of Ser. No. 504,582, Sept. 10, 1985, Pat. No. 4,540,753.

[51] Int. Cl.$^5$ .............................................. C08F 8//00
[52] U.S. Cl. .................................. 525/207; 524/571; 524/572; 524/574; 524/576; 524/579; 524/583; 524/585; 525/221; 525/222; 525/331.7; 525/331.8; 525/333.7; 525/333.9; 525/344; 525/354; 525/356; 525/386
[58] Field of Search ............... 525/331.7, 331.8, 333.7, 525/333.9, 207, 221, 222; 524/571, 572, 574, 576, 579, 583, 585

[56] References Cited

U.S. PATENT DOCUMENTS

| | | |
|---|---|---|
| 3,026,290 | 3/1962 | Gluesenkamp . |
| 3,522,180 | 7/1970 | Sweeney et al. . |
| 3,551,336 | 6/1969 | Jacobsen et al. . |
| 3,625,658 | 12/1971 | Closon . |
| 3,627,740 | 12/1971 | Schafer et al. . |
| 3,681,306 | 8/1972 | Wehmer . |
| 3,691,078 | 9/1972 | Johnston et al. . |
| 3,697,429 | 10/1972 | Engel et al. . |
| 3,739,042 | 6/1973 | Chu et al. . |
| 3,753,960 | 8/1973 | Easterbrook et al. . |
| 3,786,116 | 1/1974 | Milkovich et al. . |
| 3,790,480 | 12/1972 | Campbell et al. . |
| 3,853,969 | 12/1974 | Kontos . |
| 4,014,859 | 3/1977 | Cooper et al. . |
| 4,035,444 | 7/1977 | Yang . |
| 4,065,520 | 12/1977 | Bailey et al. . |
| 4,097,551 | 6/1978 | Digiulio et al. . |
| 4,105,609 | 8/1978 | Michon et al. . |
| 4,105,647 | 8/1978 | O'Farrell et al. . |
| 4,384,089 | 5/1983 | Dehm . |
| 4,460,755 | 7/1984 | Williams et al. . |
| 4,474,924 | 10/1984 | Powers et al. . |
| 4,480,075 | 10/1984 | Willis . |
| 4,540,753 | 9/1985 | Cozewith et al. . |
| 4,634,744 | 1/1987 | Hwang et al. . |
| 4,704,433 | 11/1987 | Ueki et al. . |
| 4,716,207 | 12/1987 | Cozewith et al. . |
| 4,786,697 | 11/1988 | Cozewith et al. . |
| 4,789,714 | 12/1988 | Cozewith et al. . |
| 4,792,595 | 12/1988 | Cozewith et al. . |
| 4,843,129 | 6/1989 | Cozewith et al. . |
| 4,874,820 | 10/1989 | Cozewith et al. . |
| 4,882,406 | 11/1989 | Cozewith et al. . |

FOREIGN PATENT DOCUMENTS 1160791 1/1988 United Kingdom .

OTHER PUBLICATIONS

"Ethylene-Propylene Copolymers, Reactivity Ratios, Evaluation and Significance," by C. Cozewith and G. Ver Strate, Macromolecules, pp. 482–489.

"Estimation of Long-Chain Branching in Ethylene–Propylene Terpolymers from Infinite-Dilution Viscoelastic Properties" by Yutaka Mitsuda, John L. Schrag (List continued on next page.)

Primary Examiner—Bernard Lipman
Attorney, Agent, or Firm—W. G. Muller

[57] ABSTRACT

Ziegler-Natta catalyzed polymer chains are end capped with at least one functional group-containing unit which is otherwise essentially absent from said polymer chain. The chains can be grafted to form graft copolymers and star copolymers. The compositions are useful as oil additives and in general purpose elastomer as well as thermoplastic polymer compositions.

7 Claims, 4 Drawing Sheets

OTHER PUBLICATIONS and John D. Ferry, Journal of Applied Polymer Science, vol. 18, pp. 193-202 (1974).

"The Effect of Molecular Weight and Molecular Weight Distribution on the Non-Newtonian Behavior of Ethylene Propylene-Diene Polymers", by C. K. Shih, the Transaction of the Society of Rheology, pp. 83-114 (1970).

"Polymerization of Ethylene and Propylene to Amorphous Copolymers with Catalysts or Vanadium Oxychloride and Alkyl Aluminum Halides" by E. Junghanns, A. Gumboldt and G. Bier, Makromol, Chem., vol. 58 (12/12/62):18-42.

"Laminar Flow Polymerization of EPDM Polymer" by J. F. Wehner; Elastomer Chemicals Department, E. E. DuPont de Nemours and Co., Inc., Deepwater, N.J.

FIG.1

CHEMISTRY
FIG. 3

LUBE OIL DISPERSANT TESTS

| SAMPLE | SLUDGE | VARNISH VIB. RATING ±1 |
|---|---|---|
| BLANK | 10.0 | 11 |
| POTENT PMD COMMERCIAL PRODUCT | 6.6 | 2 |
| NONFUNCTIONAL EP | 9.0 | 6 |
| METHYLACRYLATE CAPPED | 7.3 | 2 |
| CONTROL— OH CAPPED | 7.8 | 4 |

FIG. 4

END-CAPPED POLYMER CHAINS, STAR AND GRAFT COPOLYMERS, AND PROCESS OF MAKING SAME

BACKGROUND OF THE INVENTION

1. Cross Reference to Related Applications

This is a continuation of application Ser. No. 813,848 filed Dec. 27, 1985, abandoned, which in turn is a continuation-in-part Ser. No. 813,511 filed on Dec. 26, 1985 now U.S. Pat. No. 4,882,406, which in turn is a continuation-in-part of application Ser. No. 681,950 filed on Dec. 14, 1984 now U.S. Pat. No. 4,652,887 which in turn is a continuation-in-part of Ser. No. 504,582, U.S. Pat. No. 4,540,753 issued Sept. 10, 1985, the disclosures of which are hereby incorporated by reference thereto.

2. Field of the Invention

The present invention relates very generally to novel alpha-olefin copolymers, as well as to novel polymer configurations, and processes of forming the same. The novel products exhibit particularly useful characteristics for certain applications.

More specifically, the invention relates to ethylene alpha-olefin copolymer chains which are end-capped so as to modify their characteristics, as well as to star-shaped graft copolymers, or block copolymers, which may be formed of end capped chains, wherein the end capped chains are joined at their ends. The invention further relates to processes of forming the end-capped chains and star or block copolymers.

3. Background Description of Relevant Materials

For convenience, certain terms that are repeated throughout the present specification are defined below:

a) Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b) Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

c) Molecular weight distribution (MWD) is a measure of the range of molecular weights within a given copolymer sample. It is characterized in terms of at least one of the ratios of weight average to number average molecular weight, $\bar{M}_w/\bar{M}_n$, and Z average to weight average molecular weight, $\bar{M}_z/\bar{M}_w$, where $$\bar{M}_w = \frac{\Sigma \bar{N}_i M_i^2}{\Sigma \bar{N}_i M_i}$$

$$\bar{M}_n = \frac{\Sigma \bar{N}_i M_i}{\Sigma \bar{N}_i}, \text{ and}$$

$$\bar{M}_z = \frac{\Sigma \bar{N}_i M_i^3}{\Sigma \bar{N}_i M_i^2}, \text{ wherein}$$

$N_i$ is the number of molecules of weight $M_i$.

d) Viscosity Index (V.I.) is the ability of a lubricating oil to accommodate increases in temperature with a minimum decrease in viscosity. The greater this ability, the higher the V.I.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadiene; 1,4-hexadiene or ethylidene norbornene, which provides sufficient unsaturation to permit vulcanization with sulfur. Such polymers that include at least two monomers, i.e., EPM and EPDM, will hereinafter be collectively referred to as copolymers.

These copolymers have outstanding resistance to weathering, good heat aging properties and the ability to be compounded with large quantities of fillers and plasticizers, resulting in low cost compounds which are particularly useful in automotive and industrial mechanical goods applications. Typical automotive uses are in tire sidewalls, inner tubes, radiator and heater hose, vacuum tubing, weather stripping and sponge door-seals, and as Viscosity Index (V.I.) improvers for lubricating oil compositions. Typical mechanical uses are in appliances, industrial and garden hoses, both molded and extruded sponge parts, gaskets and seals, and conveyor belt covers. These copolymers also find use in adhesives, appliance parts, hoses and gaskets, wire and cable insulation, and plastics blending.

They are also used as impact modifiers in polyolefin and engineering thermoplastic blends. Additionally, they are used in blends with other elastomers, e.g., general purpose elastomers, as well as butyl rubber. It is desirable to control dispersion of the phases in all in all of these blends.

As can be seen from the above, based on their respective properties, EPM and EPDM find many, varied uses. It is known that the properties of such copolymers which make them suited for use in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

The efficiency of peroxide curing depends on composition. As the ethylene level increases, it can be shown that the "chemical" crosslinks per peroxide molecule increase. Ethylene content also influences the rheological and processing properties, because crystallinity, which acts as physical crosslinks, can be introduced. The crystallinity present at very high ethylene contents may hinder processibility, and may make the cured product too "hard" at temperatures below the crystalline melting point to be useful as a rubber.

Milling behavior of EPM or EPDM copolymers varies radically with MWD. Narrow MWD copolymers crumble on a mill whereas broad MWD materials will band under conditions encountered in normal processing operations. At the shear rates encountered in processing equipment, broader MWD copolymers have lower viscosity than copolymers of the same weight average molecular weight or the same low strain rate viscosity.

Thus, there exists a continuing need for discovering polymers with unique properties and compositions. This is easily exemplified with reference to the area of V.I. improvers for lubricating oils.

A motor oil should not be too viscous at low temperatures so as to avoid serious frictional losses, facilitate cold starting, and provide free oil circulation right from engine startup. On the other hand, it should not be too thin at working temperatures so as to avoid excessive engine wear and excessive oil consumption. It is most desirable to employ a lubricating oil which experiences the least viscosity change with changes in temperature.

The ability of a lubricating oil to accommodate increases in temperature with a minimum decrease in viscosity is indicated by its Viscosity Index (V.I.). The greater this ability, the higher the V.I.

Polymeric additives have been extensively used in lubricating oil compositions to impart desirable viscosity temperature characteristics to the compositions. For example, lubricating oil compositions which use EPM or EPDM copolymers or, more generally, ethylene —($C_3$-$C_{18}$) alpha-olefin copolymers, as V.I. improvers are well known. These additives are designed to permit formulation of lubricating oils so that changes in viscosity occurring with variations in temperature are kept as small as possible. Lubricating oils containing such polymeric additives can better maintain their viscosity at higher temperatures, while at the same time maintaining desirable low viscosity fluidity at engine starting temperatures.

Two important properties (although not the only required properties as is known) of these additives relate to low temperature performance and shear stability. Low temperature performance relates to maintaining low viscosity at very low temperatures, while shear stability relates to the resistance of the polymeric additives to being broken down into smaller chains.

Ideally, preferred V.I. improvers are polymers which have good shear stability. These polymers generally have low thickening efficiency and low molecular weight. However, generally, low molecular weight polymers have low bulk viscosity and exhibit cold flow. They are difficult to handle in the conventional rubber processing plant.

Furthermore it is desirable for the viscosity modifier to have dispersant characteristics. These are usually imparted by addition of polar functional groups to the polymer chain.

It has been found that when operated under carefully prescribed conditions, certain reactors can be used to make ethylene-enhanced alpha-olefin copolymers with selected properties enhanced to suit a particular intended use. Reactors which are most suitable within the context of the instant invention are mix-free tubular and batch reactors. These types of reactors, and the ways of operating them to produce polymers having optimal characteristics are the subject of the COZEWITH et al. patent, and reference is made thereto for details concerning the various operating parameters, as well as for information concerning previous known techniques.

SUMMARY OF THE INVENTION

The objectives of the invention are achieved according to the invention in which ethylene alpha-olefin polymers with functional end cap units attached thereto are prepared and used as lube oil viscosity modifiers with wax crystal modifying and dispersant characteristics, and as property control agents in blends with engineering thermoplastics or other elastomers.

The invention is this broadly directed to a Ziegler-Natta catalyzed polymer chain end capped with at least one functional group-containing unit which is otherwise essentially absent from the polymer chain. The chain itself is most preferably substantially linear. Preferably the invention is directed to a polymer chain which is an ethylene alpha-olefin copolymer. Most preferably the ethylene alpha-olefin copolymer is an ethylene propylene copolymer or an an ethylene alpha-olefin terpolymer wherein the terpolymer is an ethylene propylene non-conjugated diene terpolymer. The diene may be selected from the group consisting of: ethylidene norbornene, 1,4 hexadiene, dicyclopentadiene, or mixtures thereof.

In one embodiment the functional group is selected from the group consisting of: $-CO_2H$, $-OH$, $-SH$, $-X$, $-C-C$-benzene, $-C-C$-(pyridine), $-SO_2H$, $SO_3H$, and mixtures thereof, wherein X is a halide selected from the group consisting of fluoride, chloride, bromide, and iodide.

According to another embodiment the functional group is incorporated in a polymer selected from the group consisting of:

the monomers thereof, and mixtures thereof; wherein $R_1$–$R_4$ are hydrocarbons having 1–30 carbon atoms selected from the group consisting of: saturated or unsaturated, branched or unbranched, aliphatic, aromatic, cyclic, or polycyclic hydrocarbons, wherein $R_5$ is the same as $R_4$ but may additionally be hydrogen; and wherein x=1–10,000.

According to yet another embodiment, the functional group-containing unit is selected from the group of polymers consisting of: copolymers of ethylene and vinylacetate; ethylene and acrylic acid esters; vinyl acetate and fumaric acid esters; styrene and maleic acid esters; olefins and maleic acid esters; homopolyacrylates; and epoxidized natural rubber.

The functional group may also be selected from the group consisting of: isocyanates, urethanes, nitriles, aromatic ethers and aromatic carbonates.

The polymer chain itself preferably has a molecular weight of greater than about 500, with the end cap having a molecular weight of 28 or greater. Quite obviously, the invention is also directed to a plurality of polymer chains and to the process of making and using the same.

Preferably the plurality of polymer chains have an $\overline{M}_w/\overline{M}_n$ less than 2, and less than 1.8, and have less than 1.4. Most preferably the polymer chains have an less than 1.3.

The plurality of polymer chains preferably has a weight average molecular weight of about 2,000–12,000,00, preferably, of at least 10,000 with at least 50% of the copolymer chains being end capped. Most preferably, the plurality of polymer chains have a weight average molecular weight of at least 10,000, with at least 80% of the copolymer chains being end capped.

The inter-CD is such that 95 weight percent of the polymer chains have an ethylene composition that differs from the average weight percent ethylene composition by 15% or less preferably, by 10% or less.

The intra-CD is such that at least two portions of an individual chain, each portion comprising at least 5 percent of the chain, differ from one another by at least 5 weight percent ethylene, preferably by at least 10 weight percent ethylene, and most preferably by at least 20 weight percent ethylene.

According to yet another aspect of the invention, a star graft copolymer is disclosed which comprises a plurality of copolymer chains linked to a central polyfunctional group. The polyfunctional group is selected from the group consisting of: copolymers of ethylene and vinylacetate; ethylene and acrylic acid esters; vinyl acetate and fumaric acid esters; styrene and maleic acid esters; olefins and maleic acid esters; homopolyacrylates; and epoxidized natural rubber. In this embodiment the copolymer chains themselves are selected from the group consisting of: ethylene alpha-olefin copolymers, ethylene alpha-olefin diene terpolymers, and mixtures thereof.

The invention is also directed to a process of forming at least one ethylene alpha-olefin polymer chain from a reaction mixture by catalyzing polymerization of the reaction mixture to form the at least one chain with a Ziegler-Natta catalyst, and end capping the Ziegler-Natta ethylene alpha-olefin polymers by addition of at least one functional group-containing unit otherwise essentially absent from the polymer chain.

The invention is also directed to a polymerization process for producing copolymer in the form of at least one copolymer chain, from a reaction mixture comprised of catalyst, ethylene, and at least one other alpha-olefin monomer. As such, the improvement comprises conducting the polymerization:

a) in at least mix-free reactor;

b) with essentially one active Ziegler-Natta catalyst species;

c) using at least one reaction mixture which is essentially transfer agent-free;

d) in such a manner and under conditions sufficient to initiate propagation of essentially all of the copolymer chains simultaneously wherein the copolymer chains are dispersed within the reaction mixture: and e) end capping the Ziegler-Natta ethylene alpha-olefin polymerization by addition of at least one functional group-containing unit otherwise essentially absent from the polymer chain.

As noted above, the polymer chain is preferably an ethylene propylene copolymer or ethylene alpha-olefin terpolymer such as an ethylene propylene diene terpolymer wherein the diene is selected from the group consisting of: ethylidene norbornene, 1,4 hexadiene, and dicyclopentadiene.

The polymer chain formed according to the process is most preferably substantially linear.

The functional group used in the process is selected from the group consisting of: —$CO_2H$, —OH, —SH, —X, —C—C-benzene, —C—C-(pyridine), —$SO_2H$, $SO_3H$, and mixtures thereof, wherein X is a halide selected from the group of fluoride, chlorine, bromide, and iodide.

To add these functional groups to the end of a chain, the process comprises terminating polymerization with a suitable end capping agent. If the functional group is —OH, the capping agent is selected from the group consisting of:

wherein $R_6$ through $R_{11}$ are hydrocarbons having 1–30 carbon atoms selected from the group consisting of saturated or unsaturated, branched or unbranched being aliphatic, aromatic, cyclic, or polycyclic hydrocarbons.

Where the functional group is —$CO_2H$, the capping agent is carbon dioxide, whereas where the functional group is —SH, the process comprises end capping the polymerization with an agent selected from the group consisting of: sulfur and $H_2C$=S.

If the functional group is —X, the process comprises end capping the polymerization with an agent selected from the group consisting of: fluoride, chloride, bromide, iodine, and mixtures thereof.

When the functional group is —C—C-benzene, the process comprises end capping the polymerization with styrene; while with the functional group being —C—C-

(pyridine), the process comprises and capping the polymerization with vinyl pyridine.

With the functional group being —SO₂H, the process comprises and capping the polymerization with SO₂, whereas with —SO₃H, the process comprises and capping the polymerization with SO₃.

According to yet another alternative the functional group is incorporated as a polymer selected from the group consisting of:

the monomers thereof, and mixtures thereof; wherein R₁ through R₄ are hydrocarbons having 1-30 carbon atoms selected from the group consisting of saturated or unsaturated, branched or unbranched, aliphatic, aromatic, cyclic, or polycyclic hydrocarbons, wherein R₅ is the same as R₄ but may additionally be hydrogen, and wherein x=1-10,000.

To provide the above and caps, the process comprises end capping the polymerization with butadiene Alternatively the functional group-containing unit is selected from the group consisting of: copolymers of ethylene and vinylacetate; ethylene and acrylic acid esters; vinyl acetate and fumaric acid esters; styrene and maleic acid esters; olefins and maleic acid esters; homopolyacrylates; and epoxidized natural rubber; or isocyanates, urethanes, nitriles, aromatic ethers, aromatic carbonates, and mixtures thereof. These functional groups are used to form graft to copolymers.

The process of end capping is performed while substantially all of the Ziegler catalyst species are alive and attached to growing copolymer chains.

The invention is also directed to a process of forming a star or graft copolymer comprising a plurality of polymer chains linked to a central polyfunctional group comprising:

a) forming the polymer chains with an end cap functional group of at least one monomer otherwise essentially absent form the polymer chains; and b) linking the end cap functional groups to the central polyfunctional group.

The end cap functional group may be a halogen, selected from fluorine, chlorine, bromine, or iodine, with the end cap functional groups being coupled by alkylation to a polystyrene central functional group.

The invention is also directed to an oil composition comprising the above end capped polymer chains, as well as to an impact-modified engineering thermoplastic composition comprising: 1-40% of an ethylene alpha-olefin copolymer end capped with methyl methacrylate, and 99-60% polymethacrylate.

More broadly the chains of the invention also find use in impact modified engineering thermoplastic polymer composition comprising 1-40% of an ethylene alpha-olefin copolymer end capped with segments of the engineering thermoplastic polymer and 99-60% of the engineering thermoplastic. The ethylene alpha-olefin copolymer has at least one of $\overline{M}_w/\overline{M}_n$ less than 2.0, and $\overline{M}_z/\overline{M}_w$ less than 1.8 and the intra-CD is such that at least two portions of an individual chain, each portion comprising at least 5 percent of the chain, differ from one another by at least 5 weight percent ethylene.

Also, broadly, the invention is directed to an elastomer blend composition comprising a general purpose elastomer and a substantial amount of an ethylene alpha-olefin copolymer end capped with segments of the general purpose elastomer. As before, the alpha-olefin copolymer is an ethylene propylene terpolymer which has at least one of $\overline{M}_w/\overline{M}_n$ less than 2.0, and $\overline{M}_z/\overline{M}_w$ less than 1.8 and the intra-CD is such that at least two portions of an individual chain, each portion comprising at least 5 percent of the chain, differ from one another by at least 5 weight percent ethylene.

Generally, the invention relates to any composition comprising a plurality of chains as defined above wherein at least 50% of the chains in the composition are end capped.

Finally, the invention also relates to a lubricating oil composition of less than 50 weight percent hydrocarbon mineral oil, wax crystal modifier, and a compatabilizing amount of one of polymer chain according to the invention.

DETAILED DESCRIPTION OF THE INVENTION

Ethylene propylene polymerizations are catalyzed by means of Ziegler-Natta catalysts through a mechanism involving rapid initiation and slow termination compared to chain growth. It is believed that during such polymerization the catalyst remains attached to the end of the "live" chain while the chain is growing, always occupying the last position on the chain. Chain length is normally limited as a result of catalyst deactivation or quenching.

According to the invention it has been found that this mechanism can be put to good advantage if the quenching agent utilized serves to not only quench the catalyst and thus terminate growth of the original chain, but also itself has at least one functional group thereon which permits it to attach to the polymer chain end. These quenching agents shall be referenced as end capping agents.

The invention in its most basic terms is thus directed to a process of end-capping polymer chains with units having at least one functional group thereon, or which produce at least one functional group. The invention is further directed to a process end-capping such growing polymer chains.

While this invention is directed most broadly at end capping chains generally, it is more specifically directed at end capping ethylene alpha-olefin chains, and most preferably at end capping those chains having a narrow MWD as this term is defined in the COZEWITH et al. patent. Most preferably, the very process of end capping is performed on chains which are "tailor-made" according to the COZEWITH et al. patent process. Thus, by utilizing this process one is able to assure that the chains have a narrow distribution, and carefully controlled weight and length before the chains are end capped, and further ethylene or olefin copolymer growth is arrested.

The MWD of the copolymer prior to end capping is preferably very narrow. For example, an indication of a narrow MWD in accordance with the present invention is that the ratio of weight to number average molecular weight ($\overline{M}_w/\overline{M}_n$) is less than 2. Alternatively, a ratio of the Z-average molecular weight to the weight average molecular weight of less than 1.8 typifies a narrow MWD in accordance with the present invention. It is known that the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby $\overline{M}_w/\overline{M}_n$ raise above 2 while maintaining less than 1.8. Therefore, the polymers, in accordance with the present invention, which are to be end capped, are characterized by having at least one of less than 2 and less than 1.8.

To obtain high intramolecular compositional heterogeneity, high intermolecular homogeneity and narrow MWD, the copolymers in accordance with the present invention are preferably made in a tubular reactor by means of the technique disclosed in COZEWITH et al.

Thus, according to a preferred embodiment of the invention alpha-olefin copolymers, more specifically ethylene alpha-olefin copolymers may be end capped to produce useful polymer chains. Most preferably, the ethylene alpha-olefin is an ethylene-propylene copolymer. As used herein the term "copolymer" when used to describe the alpha-olefin includes copolymers of ethylene and propylene (EPM), as well as ethylene propylene diene terpolymer copolymers (EPDM).

The diene is most preferably selected from the group consisting of: ethylidene norbornene, 1,4 hexadiene, dicyclopentadiene, and mixtures thereof.

Copolymers in accordance with the present invention are preferably made in a tubular reactor. When polymerizing in a tubular reactor, the ethylene and propylene are fed to the reactor inlet along with a suitable Ziegler-Natta catalyst. The catalyst is preferably chosen so that it produces essentially one active catalyst species. Also, chain transfer reactions during the polymerization must be minimized. It is well known that ethylene is much more readily polymerized than propylene. Consequently, the concentration of monomer changes along the tube in favor of propylene as the ethylene is depleted. The result is copolymer chains which are higher in ethylene content in the chain segments grown near the reactor feed inlet and higher in propylene in the segments grown near the reactor outlet. The resulting chain is intramolecularly heterogeneous. The extent of heterogeneity in ethylene/propylene compositions can be moderated somewhat by feeding additional ethylene at points along the reactor to keep the ethylene/propylene monomer ratio at a more constant value. It is an object of this invention to produce chains with a minimum of interchain compositional variation. This is accomplished by utilizing a Ziegler catalyst that forms essentially one active catalyst species, minimizing chain transfer initiating propagation of essentially all simultaneously, and conducting the polymerization such that the major portion of the catalyst remains active for the entire length of time that polymerization is occurring in the reactor. The tubular reactor is also operated at conditions such that the copolymer chains have a narrow MWD characterized by at least one of the ratios of and $\overline{M}_z/\overline{M}_w$ being less than 2.0 and 1.8, respectively, prior to end capping.

An illustrative copolymer chain of ethylenepropylene is schematically presented below, with E representing ethylene constituents, and P representing propylene constituents in the chain:

| Segment: | 1 | 2 | 3 | 4 |
|---|---|---|---|---|
| | E—E—E—E—P | E—E—E—P—P | E—E—P—P—P | E—P—P—P—P |

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right, with the more reactive ethylene being depleted and the reaction mixture proportionately increasing in propylene concentration, the subsequent chain segments become more concentrated in propylene. The resulting chain is intramolecularly heterogeneous.

In the event that more than two monomers are used, e.g., in the production of EPDM using a diene termonomer, for the purpose of describing the present invention all properties related to homogeneity and heterogeneity will refer to the relative ratio of ethylene to the other monomers in the chain. The property, of the copolymer discussed herein, related to intramolecular compositional dispersity (compositional variation within a chain) shall be referred to as Intra-CD.

For copolymer chains in accordance with the present invention, composition can vary between chains as well as along the length of the chain. In one embodiment, an object of this invention is to minimize the amount of interchain variation. The Inter-CD can be characterized by the difference in composition between some fraction of the copolymer and the average composition, as well as by the total difference in composition between the copolymer fractions containing the highest and lowest quantity of ethylene. Techniques for measuring the breadth of the Inter-CD are known, as illustrated by Junghanns et al., wherein a p-xylene-dimethylformamide solvent/non-solvent was used to fractionate copolymer into fractions of differing intermolecular composition. Other solvent/non-solvent systems can be used, such as hexane or 2-propanol, as will be discussed in more detail below.

The Inter-CD of copolymer in accordance with one embodiment of the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 weight %.

Broadly, the Intra-CD of copolymer in accordance with one embodiment of the present invention is such that at least two portions of an individual intramolecularly heterogeneous chain, each portion comprising at least 5 weight percent of the chain, differ in composition from one another by at least 5 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent ethylene, as well as of at least 40 weight percent ethylene, are also considered to be in accordance with the present invention.

The experimental procedure for determining Intra-CD and Inter-CD are disclosed in COZEWITH et al. and reference is made thereto for further detail.

In addition to ethylene, propylene and other alpha-olefins and non-conjugated dienes. The end capping reactions incorporate additional new structures which must be analyzed. This can be done by repeated precipitation of the polymer product to insure that there are no functional units present which are not attached to the polymer. Then standard techniques such as infra-red spectroscopy and nuclear magnetic resonance can be used to assay compositions quantitatively.

Furthermore, to insure that the end capping units are attached to the polymer, a size exclusion chromatography experiment can be run in which two detectors are used to identify the effluent, a differential refractometer (DRI) and an ultraviolet spectrometer (UV). In general ethylene alpha-olefin portion of the polymer has no UV absorbance, whereas the end capping units do. Thus if the DRI signal, which the ethylene and olefin section of the polymer molecule exhibits, is accompanied by a UV response over the same elution time range, this is strong evidence that the functional groups are attached to the polymer. In certain cases the UV signal can be enhanced by addition of aromatic groups to existing functionality. For example, phenyl isocyanate can be added to hyroxyl groups which are attached to the polymer chain, thus enhancing the UV response.

As already noted, the uncapped polymer in accordance with the present invention is preferably comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred alpha-olefin in accordance with the present invention is propylene.

The average ethylene content of the polymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%. The ethylene content of the two segments comprising the polymer can be the same or different.

The molecular weight of copolymer made in accordance with the present invention can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000. The preferred minimum molecular weight for an ethylene-propylene copolymer chain segment is 20,000.

As noted above, another feature of the ethylene alpha-olefin polymer made in accordance with the present invention is that the molecular weight distribution (MWD) is very narrow, as characterized by at least one of a ratio of of less than 2 and a ratio of of less than 1.8 for the whole polymer and the first chain segment. Some typical advantages of such polymers having narrow MWD are greater resistance to shear degradation. Particularly for oil additive applications, the preferred copolymers have $\overline{M}_w/\overline{M}_n$ less than about 1.6, with less than about 1.4 being most preferred. The preferred is less than about 1.5, with less than about 1.3 being most preferred.

Solution polymerizations are preferred for the chain polymerization process of this invention. Any known solvent for the reaction mixture that is effective for the purpose can be used. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichlorethane and trichloroethane.

The polymerization process is preferably performed in a mix-free reactor system, which is one in which substantially no mixing occurs between portions of the reaction mixture that contain polymer chains initiating at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. Although it may be possible to end cap a significant fraction of the chains in a single CFSTR effluent, the narrow MWD copolymer of this invention cannot be obtained. However, it is well known that 3 or more stirred tanks in series with all of the catalyst fed to the first reactor can approximate the performance of a tubular reactor. Accordingly, such tanks in series are considered to be in accordance with the present invention, and as being the functional equivalent of the tubular reactor.

A batch reactor is a suitable vessel, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for carrying out the processes of this invention.

In addition to the importance of the reactor system to make copolymers in accordance with the present invention, the polymerization of the chains should preferably be conducted such that:

a. The catalyst system produces essentially one active catalyst species, b. the reaction mixture is essentially free of chain transfer agents, and c. the polymer chains are essentially all initiated simultaneously, which is at the same time for a batch reactor or at the same point along the length of the tube for a tubular reactor.

The desired polymer can be obtained if more than one feed of solvent and reactants (e.g., at least one of the ethylene, alpha-olefin and diene) are added either at at least one point along the length of a tubular reactor or during the course of polymerization in a batch reactor. Operating in this fashion may be desirable in certain circumstances to control the polymerization rate or polymer composition. However, it is necessary to add essentially all of the catalyst at the inlet of the tube or at the onset of batch reactor operation to meet the requirement that essentially all polymer chains be initiated simultaneously.

Accordingly, polymerization processes in accordance with the present invention are most preferably performed:

(a) in at least one mix-free reactor, (b) using a catalyst system that produces essentially one active catalyst species, (c) using at least one reaction mixture which is essentially transfer agent-free, and (d) in such a manner and under conditions sufficient to initiate propagation of essentially all polymer chains simultaneously.

After growing the polymer chains to the desired molecular weight, end capping agent is fed to add one or more end capping units to the polymer chain, or to produce a structure grafted by the ethylene alpha-olefin chains.

Since the tubular reactor is the preferred reactor system for carrying out processes in accordance with the present invention, the following illustrative description and examples are drawn to that system, but will apply to other reactor systems as will readily occur to the artisan having the benefit of the present disclosure.

In practicing processes in accordance with the present invention, use is preferably made of at least one tubular reactor. Thus, in its simplest form, such a process would make use of but a single reactor. However, as would readily occur to the artisan having the benefit of the present disclosure, more than one reactor could be used, either in parallel for economic reasons, or in series with multiple monomer feed to vary intramolecular composition.

For the various structures which may be prepared using the process of the invention, references made to COZEWITH et al. which illustrate how the mix-free reactor is fed differently as a function of the final composition and characteristics which are desired.

The composition of the catalyst used to produce alpha-olefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could be present, provided the copolymer product is in accordance with the present invention, e.g., narrow MWD and Inter- CD. It is believed that such additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. VerStrate, Macromolecules, 4, 482 (1971), which is incorporated herein by reference.

It is disclosed by the authors that copolymers made in a continuous flow stirred reactor should have an MWD characterized by and a narrow Inter-CD when one active catalyst species is present. By a combination of fractionation and gel permeation chromatography (GPC) it is shown that for single active species catalysts the composition of the fractions vary no more than ±3% about the average and the MWD (weight to number average ratio) for these samples approaches two (2). It is this latter characteristic of ($\overline{M}_w/\overline{M}_n$ of about 2) that is deemed the more important in identifying a single active catalyst species. On the other hand, other catalysts gave copolymer with an Inter-CD greater than ±10% about the average, and multi-modal MWD with a value greater than about 2. These other catalysts are deemed to have more than one active species.

Catalyst systems to be used performing processes according to the present invention may be Ziegler-Natta copolymerization catalysts, which may typically include:

(a) a compound of a transition metal, i.e., a metal of Groups I-B, III-B, IVB, VB, VIB, VIIB, and VIII of the Periodic Table, and (b) an organometal compound of a metal of Groups I-A, II-A, II-B, and III-A of the Periodic Table.

The preferred catalyst system in practicing processes in accordance with the present invention comprises hydrocarbon-soluble vanadium compound in which the vanadium valence is 3 to 5 and an organo-aluminum compound, with the provision that the catalyst system yields essentially one active catalyst species as described above. At least one of the vanadium compound-/organo-aluminum pair selected must also contain a valence-bonded halogen.

Vanadium compounds useful in practicing processes in accordance with the present invention could be:

where x = 0-3 and R = a hydrocarbon radical;

VCl$_4$;
VO(AcAc)$_2$, where AcAc=acetyl acetonate;
V(AcAc)$_3$;
VOCl$_x$(AcAc)$_{3-x}$, (2) where x=1 or 2; and
VCl$_3$.nB where n 2-3 and B Lewis base capable of making hydrocarbon-soluble complexes with VCl$_3$, such as tetrahydrofuran, 2-methyl-tetrahydrofuran and dimethyl pyridine.

In formula 1 above, R preferably represents a C$_1$ to C$_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. Non-limiting illustrative examples of formula (1) compounds are vanadyl trihalides, alkoxy halides and alkoxides such as VOCl$_3$, VOCl$_2$(OBu) where Bu=butyl, and VO(OC$_2$H$_5$)$_3$. The most preferred vanadium compounds are VCl$_4$, VOCl$_3$, and VOCl$_2$(OR).

As already noted, the co-catalyst is preferably organo-aluminum compound. In terms of chemical formulas, these compounds could be as follows:

| | |
|---|---|
| AlR$_3$, | Al(OR')R$_2$ |
| AlR$_2$Cl, | R$_2$Al—O—AlR$_2$ |
| AlR'RCl, | AlR$_2$I |
| Al$_2$R$_3$Cl$_3$, | |
| AlRCl$_2$, | and mixtures thereof | where R and R' represent hydrocarbon radicals, the same or different, as described above with respect to the vanadium compound formula. The most preferred organo-aluminum compound is an aluminum alkyl sesquichloride such as Al$_2$Et$_3$Cl$_3$ or Al$_2$(iBu)$_3$Cl$_3$.

In terms of performance, a catalyst system comprised of VCl$_4$ and Al$_2$R$_3$Cl$_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known, certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25; however, a maximum of about 17 is more preferred. The most preferred maximum is about 15.

Chain transfer agents for the Ziegler-catalyzed polymerization of alpha-olefins are well known and are illustrated, by way of example, by hydrogen or diethyl aluminum chloride, or zinc diethyl for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and reduce the fraction of chains that become end capped. Preferably, less than 50% of the polymer formed should have undergone transfer reactions.

Thus, the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum co-catalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalysts activity. Chain transfer with propylene can best be limited by avoiding high temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

When catalyst deactivation is occurring, the feed containing capping agent is preferably added to the reactor at a point during the polymerization where at least 50% of the Ziegler catalyst is still active and attached to growing chains.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of non-simultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment could be as low as about 0.1 second.

The preferred minimum aging period is about 0.5 seconds, while the most preferred minimum aging period is about 1 second. While the maximum aging period could be higher, for the preferred vanadium/organo-aluminum catalyst system the preferred maximum is at least 500 seconds and possibly about 5000 seconds. A more preferred maximum is about 200 seconds. The most preferred maximum aging period is about 100 seconds. The premixing could be performed at a low temperature such as 40° C. or below. It is preferred that the premixing be performed at 25° or below, with 15° or below being most preferred.

The temperature of the reaction mixture should also be kept within certain limits. The temperature at the reactor inlet should be high enough to provide complete, rapid chain initiation at the start of the polymerization reaction. The length of time that the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from $-50°$ C. to 140° C. It is believed that the outlet temperature of the reaction mixture could be as high as about 150° C. The preferred maximum outlet temperature is about 70° C. The most preferred maximum is about 50° C. In the absence of reactor cooling, such as by a cooling jacket, to remove the heat of polymerization, the temperature of the reaction mixture will increase from reactor inlet to outlet by an amount dependant on the heat of polymerization, reaction mixture specific heat, and the weight percent of copolymer in the reaction mixture. For ethylene-propylene copolymerization in hexane solvent the temperature rise is about 13 degrees C. per weight percent of copolymer formed.

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 weight percent $\times 10°$ C./wt. $\% = 50°$ C. To maintain an outlet temperature of 35° C., it will thus require a feed that has been prechilled to 35° C.$-50°$ C.$= -5°$ C.. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt./100 wt. diluent. There is no lower limit to concentration due to reactor operability, but for economic reasons, it is preferred to have a copolymer concentration of at least 2 wt./100 wt. diluent. Most preferred is a concentration of at least 3 wt./100 wt. diluent.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains, but also to minimize radial temperature gradients due to the heat generated by the polymerization reaction. Radial temperature gradients will tend to broaden the molecular weight distribution of the copolymer, since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 1 second. A preferred minimum is about 10 seconds. The most preferred minimum is about 15 seconds. It is believed that the maximum could be as high as about 3600 seconds. A preferred maximum is about 1800 seconds. The most preferred maximum is about 900 seconds.

From the above extensive description of making the polymer chains it will be understood that depending upon the desired functionality of the chains, end capping units which have one or a multiplicity of functionalities and which themselves may or may not polymerize are introduced into the reactor to quench the ethylene alpha-olefin Ziegler-Natta polymerization.

As noted above, the end cap units may have one or more than one functionality.

According to the invention, unifunctional end capping units may be selected from the group consisting of: —CO₂H (1) —OH (2), —SH (3), —X (4), —C—C-benzene (5), —C—C-pyridine) (6), —SO₂H (7), SO₃H (8), and mixtures thereof, wherein X is a halide selected from the group consisting of fluorine, chlorine, bromine, and iodine.

The quenching agents used to prepare the above capping units, as numbered, are:

$$CO_2 \quad (1)$$

(2)

$$O_2, \\ CO, \\ H_2C{=}O, \\ R_7CH{=}O,$$

wherein R₆ through R₁₁ are selected from the group consisting of alkyl having 1–30 carbon atoms, saturated or unsaturated, branched or unbranched, aliphatic, aromatic, cyclic, or polycyclic hydrocarbons;

| | |
|---|---|
| sulfur and H₂C=S | (3) |
| fluoride, chloride, bromide, iodide, and mixtures thereof | (4) |
| styrene | (5) |
| vinyl pyridine | (6) |
| SO₂ | (7) |
| SO₃ | (8) |

In the case of unsaturated ester and ketone capping agents, ketone and ester functionally, in addition to hydroxyl functionality, may be produced.

By way of example only, the following capping units may be used; acetaldehyde, methyl acetate, and methyl ethyl ketone.

The chains are then used as is, or may be nodularized as disclosed in U.S. application Ser. No. 813,511, Attorney's Docket No. P5067, filed on Dec. 26, 1985, in the name of Applicants, the disclosure of which is hereby incorporated by reference thereto. Alternatively, depending upon the extent and distribution of non-conjugated diene in the chains, the chains may be vulcanized as desired.

In yet another approach the end cap may be composed of one monomer, of a polymer chain of the monomers to form a novel composition composed of the original alpha-olefin chain which is coupled to the monomer or polymer chain, i.e., a graft copolymer. Where the functional group is incorporated as a polymer, the polymer itself may be formed prior to or after being linked to the original polymer.

In this embodiment the functional group may be incorporated as a polymer unit selected from the group consisting of:

the monomers thereof, and mixtures thereof; wherein $R_1$ through $R_4$ are selected from the group consisting of: alkyl having 1-30 carbon atoms, saturated or unsaturated, branched or unbranched, aliphatic, aromatic, cyclic, or polycyclic hydrocarbons, and $R_5$ is the same as $R_4$ but may additionally be hydrogen, and wherein $x = 1-10,000$.

Specific compounds include: polycylacrylate, polymethylvinylketone, and polystyrene.

The process of the invention used to end cap with the above monomers or polymers comprises reacting the growing chain, respectively with the following capping agents:

(1)

(2)

(3)

(4)

butadiene  (5)

(6)

(7)

Specific compounds include: decylacrylate, methylvinyl ketone, styrene, vinyl pyridine, vinyl acetate, methyl vinyl ether, and methyl methacrylate.

End capping with any of the above agents (1)-(7) may be performed by injecting the capping agent into the polymerization reactor to quench further ethylene alpha-olefin Ziegler-Natta polymerization, after which the end capping reagent itself may be polymerized to form a block copolymer. For further polymerization to occur in this fashion the catalyst used in the original polymerization must be capable of polymerizing the agent by some mechanism, either anionic, radical, cationic, or coordination.

This additional polymerizaton of the agent may be formed in the same reactor, or in a different reactor.

The endcapping group may be polymeric, in which case star shaped or graft polymers may be formed. These polyfunctional end capping groups may be selected from the group of copolymers consisting of: copolymers of ethylene and vinylacetate (1); ethylene and acrylic acid esters (2); vinyl acetate and fumaric acid esters (3); styrene and maleic acid esters (4); olefins and maleic acid esters (5); homopolyacrylates (6); and epoxidized natural rubber (7).

EXAMPLES

EXAMPLE 1

Figure 1:
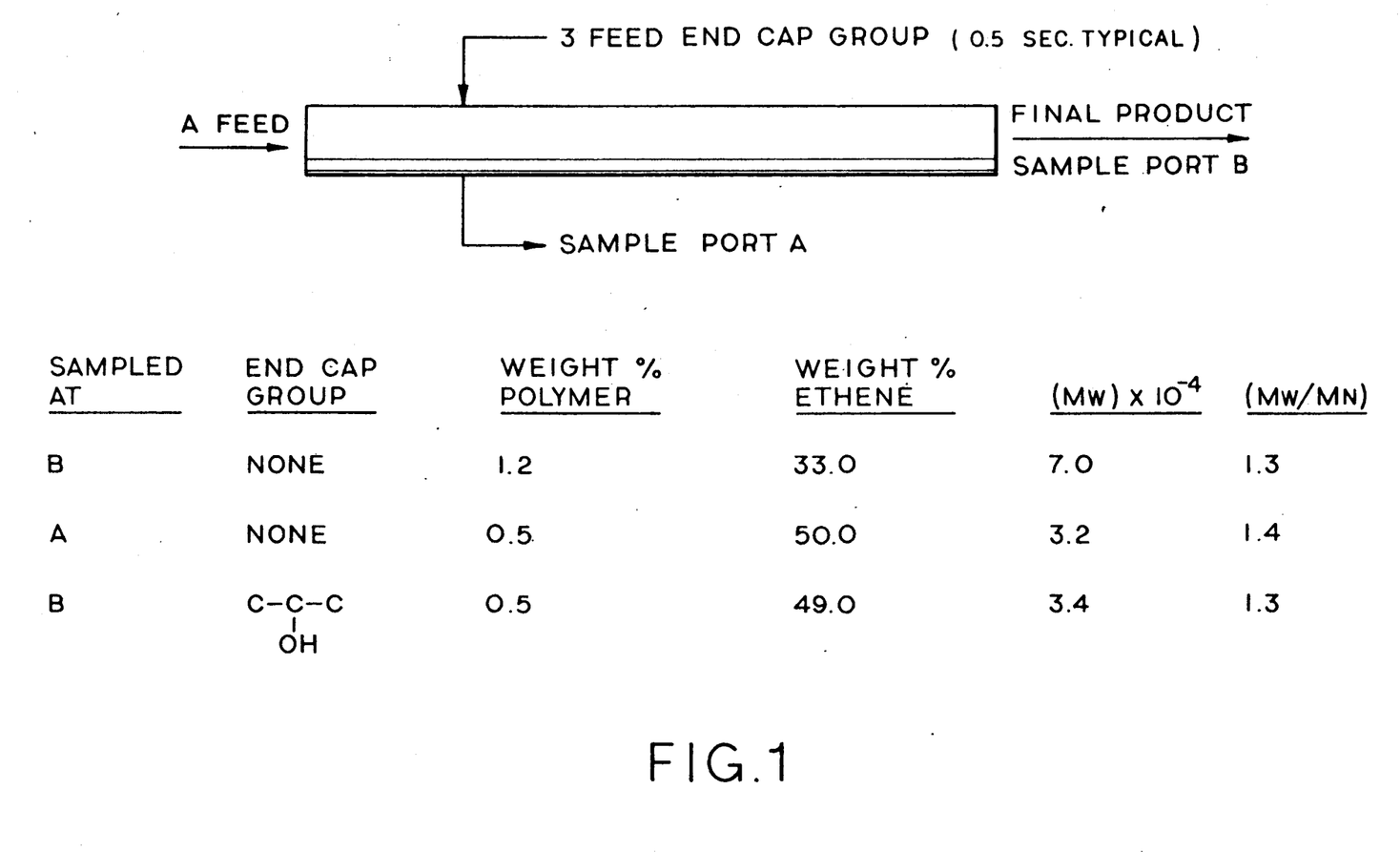
FIG. 1 illustrates a production scheme for incorporating functional group containing end cap units into a reaction mixture being Ziegler-Natta polymerized.

An ethylene propylene polymerization is performed in a tubular reactor with reaction mixture A, and supplemental feed B injected at a point along the tubular reactor as shown in FIG. 1. The tubular reactor is operated as indicated above under conditions which are capable of providing a narrow MWD. Thus, catalyst and co-catalyst are pre-mixed at 10 degrees C. for 8 seconds prior to contacting the chilled monomers in an impingement mixer at the reactor inlet. The following parameters are used:

|  | A Feed | B Feed |
| --- | --- | --- |
| hexane kg/hr. | 52.8 | 6.6 |
| $VCl_4$ kg/hr | 6.5 | 0 |
| $Al_2Et_3Cl_3$ kg/hr | 33.3 | 0 |
| Ethylene kg/hr | 0.27 | 0 |
| Propylene kg/hr | 2.8 | 0 |
| Isopropyl alcohol gm/hr |  |  |
| Run 1 | 0 | 0 |
| Run 2 | 0 | 50.3 |

A proton donor chain terminating agent isopropyl alcohol, is included in the reaction mixture only in Run 2.

It is apparent that sampling at Port A or, injecting isopropyl alcohol in feed B and sampling at Port B produces the same product. If the polymerization is permitted to proceed undisturbed to port B a higher molecular weight polymer than in the case of addition of terminating agent is produced. This establishes that the catalyst terminating agent isopropyl alcohol has reacted with essentially all of the growing polymer chains near the B feed point. Using this approach it is possible to perform a variety of chemical reactions with growing ethylene propylene chains.

EXAMPLE 2

Figure 2:
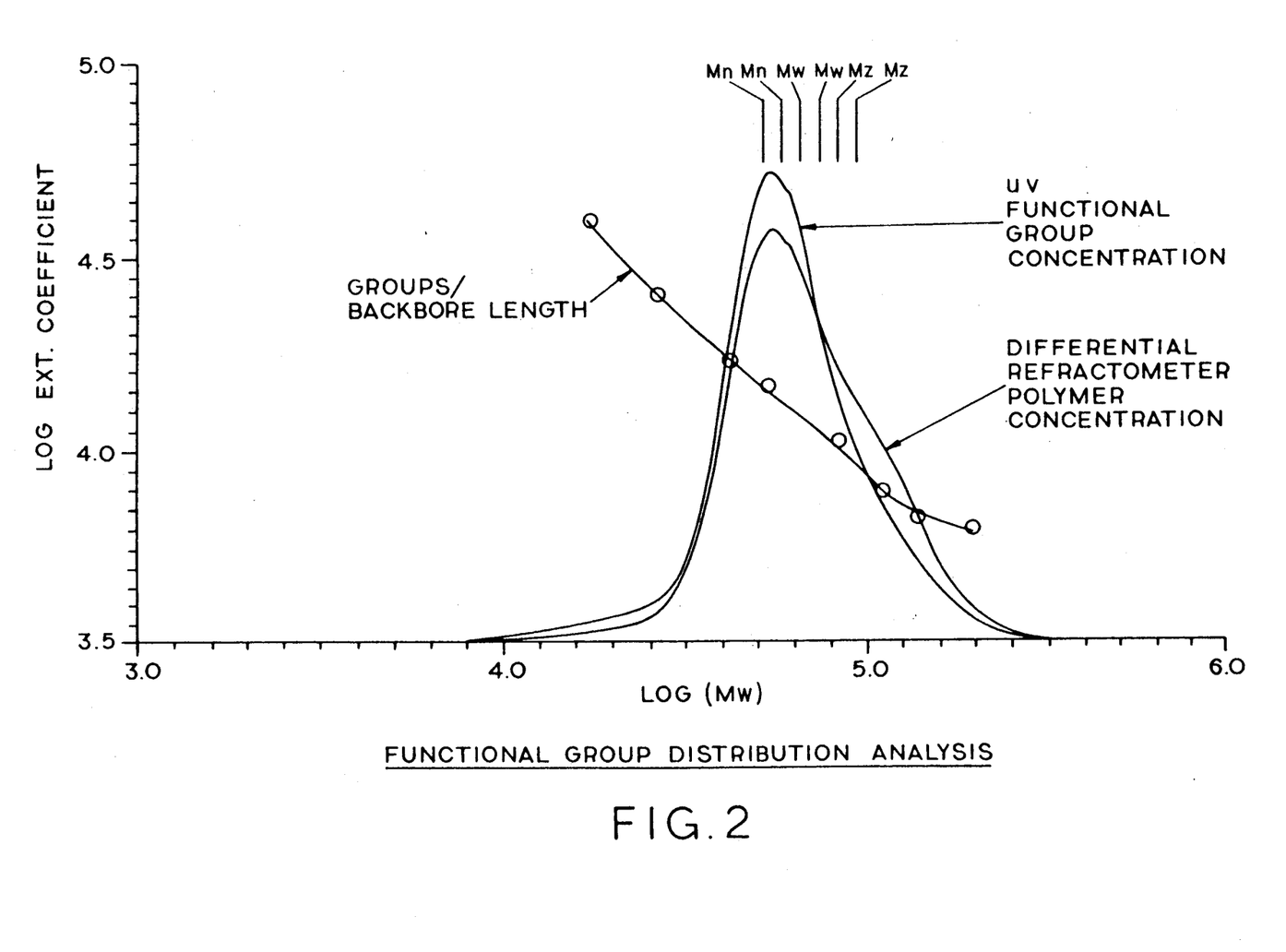
FIG. 2 illustrates the results of uv analysis of a sample by separating the product on the basis of molecular size.

Catalyst and monomers are fed to a tubular reactor as in Example 1, run 1. Methylacrylate is fed at port B at 156 gms./hr in a hexane stream of 6.6 kg/hr. This corresponds to a ratio of about 50 moles acrylate/mole vanadium. The product is collected at port B. The hexane solution is washed with equal volumes of 1N HCl and then $H_2O$ in a blender and then with an equal volume of methanol to remove both catalyst residues and unreacted monomer. Infrared analysis shows the presence of ester carbonyl at 1740 $cm^{-1}$ Proton NMR shows the presence of 0.3 mole % $OCH_3$ based on as the predominant monomer unit. This indicates approximately one group per $2.3 \times 10^4$ molecular weight unit of ethylene propylene backbone. The number average molecular weight of the polymer is about $6 \times 10^4$ by gel permeation chromatography, thus there are approximately 3 OCH$_3$ groups per molecule. The fact that these groups are actually attached to the polymer molecule and that there are approximately the same number of groups per molecule can be seen from a gel permeation chromatography experiment with both differential refractometer and ultraviolet detectors. The chromatograph separates the product on the basis of molecular size. The differential refractometer is sensitive primarily to the polymer backbone which is not UV active, i.e., a non-functional ethylene propylene polymer produces no UV signal, whereas the carbon-oxygen functionality of the ester group does produce a UV signal. Results are illustrated in FIG. 2. The fact that the UV and differential refractometer signals appear over the same molecular weight range indicates that the UV-active group is attached to the polymer. It is not likely that the methylacrylate has accidentally polymerized by itself to exactly the same molecular weight as the ethylene propylene polymer because the same result is produced at various methylacrylate concentrations. If the differential refractometer signal is divided into the UV signal, a measure of functional group concentration per backbone molecular weight is obtained. This result is shown in FIG. 2 where the quotient has approximately 1/M dependence indicating a similar number of groups per chain, not per backbone length. They are most likely located at the chain ends where they have reacted with the growing Ziegler-Natta catalyst center such that after one or more such units have added, further chain growth with monomer present in the chain ceases.

EXAMPLE 3

Figure 3:
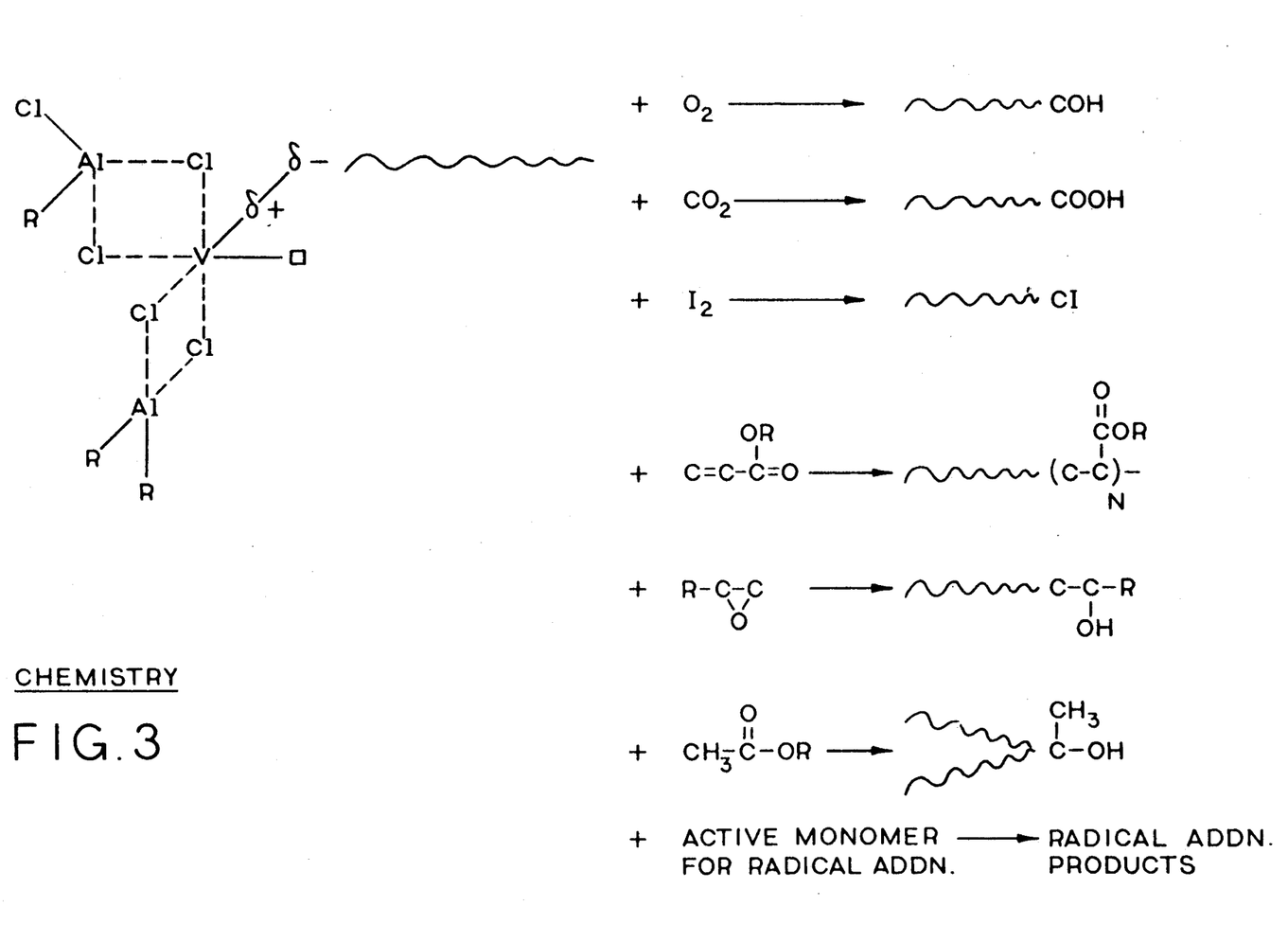

Polymerization is conducted as in Example 2 except capping agents are added as in FIG. 3. Each capping agent interacts with the polymerization as evidenced by inhibition of ethylene and propylene addition. Incorporation into the chain is demonstrated by GPC-UV and infrared spectrocopy.

| Run | Agent | Molar Ratio on Vanadium | Functionality Type in Chain | Groups/ Chain |
|---|---|---|---|---|
| A | methyl methacrylate | 25:1 | ester | 1.2 |
| B | methyl vinylketone | 25:1 | ketone | N.A. |
| C | propylene oxide | 25:1 | hydroxyl | 1.0 |
| D | styrene oxide | 25:1 | hydroxyl | N.A. |
| E | dimethyladipate | 25:1 | hydroxyl | .2 |
| F | styrene | 25:1 | aromatic | .6 |
| G | vinyl pyridine | 25:1 | pyridinyl | N.A. |
| H | 1,2 epoxy-phenylpropane | 25:1 | hyroxy, aromatic | N.A. |

N.A. Not available

EXAMPLE 4

In this example certain capped products of Example 3 and N-aminopropyl morpholine adducts of them were tested in a lubricating oil dispersancy test. In this bench test the ability of functionalyzed polymers to disperse sludge and inhibit varnish formation is assessed. Results are presented in Table 4-1 and show that the functionalized polymers have dispersancy and varnish inhibition properties that make them useful as multifunctional viscosity modifiers.

EXAMPLE 5

A polymerization is conducted as in Example 1 run 1. The entire product collected from sample port A is collected under nitrogen into nitrogen sparged water. The product is tested for hydroxyl functionality by reacting with phenyl isocyanate and testing for enhanced absorptivity in a GPC-UV experiment. No functionality is found.

EXAMPLE 6

Figure 4:
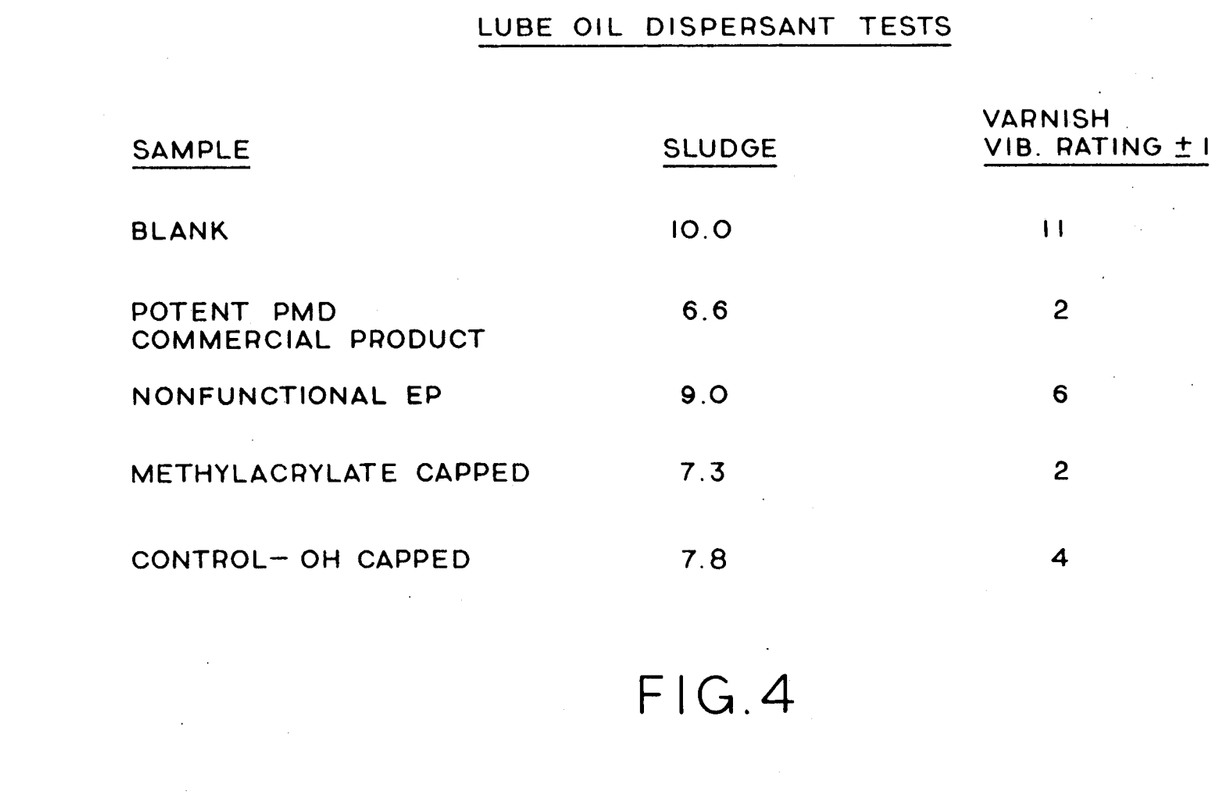

This example demonstrates that useful functionality can be produced by quenching with oxygen present in air. A polymerization is run as in example 1 run 1 with the entire product collected from sample port A exposed to and mixed with air. The product is tested for hydroxyl functionality by reaction with phenyl isocyanate. The UV absorbance increases by a factor of 10. This original product collected at port A is treated for dispersancy and is found to outperform the nonfunctional EP. See FIG. 4.

EXAMPLE 7

This example demonstrates that the chain end functionality can be reacted with other polymeric substrates to form block polymers which are useful as compatabilizers in ethylene-propylene blends With other polymers. R-45M, a hydroxy-terminated polybutadiene polymer sold by Atlantic Richfield (ARCO) is reacted with toluene diisocyanate at 80° C. with two moles of NCO per mole of OH. The isocyanate-capped product is in turn reacted with the product from run D of example 3. GPC-UV indicates the polybutadiene is added to the ethylene propylene polymer to form a block polymer. The product is useful in particle size control in polybutadiene-EP blends.

EXAMPLE 8

In this example EP chains are added directly to a low molecular weight lubricating oil flow improver to form EP grafts on that structure. The product is useful as a combination lube oil viscosity modifier and low temperature pumpability improver.

A polymerization is operated as in example 1 run 1 except that a copolymer containing long chain alkyl ester groups (PARAFLOW 384, Exxon Chemical Co.) is added as B feed so that approximately 50% of the recovered product is EP. The EP is attached to the flow improver and is useful as an oil additive.

EXAMPLE 9

An ethylene propylene ethylidine norbornene terpolymer is prepared by the process in example 1 with product recovery from part B with exposure to air. The product contains hydroxyl end functionality and exhibits improved adhesion to inorganic fillers.

EXAMPLE 10

A nodular ethylene propylene copolymer is formed by initiating the polymerization in the presence of norbornadiene, thus forming a nodular branched structure. Additional monomers are then added to lengthen the nodular "arms" (the chain segments protruding from the nodule). Methyl acrylate is added to end cap the arms. The product is a multifunctional shear stable viscosity modifier. A similar result would be achieved if the methyl acrylate functional group were in the nodule itself, rather than at the ends of the protruding segments.

EXAMPLE 11

In this example a block polymer is formed by direct polymerization on the end of an EP chain.

A polymerization is carried out as in Example 1 except that V(acac)$_3$ is used as the catalyst and methylacrylate is added at 500:1 on vanadium. Methylacrylate adds to the ethylene propylene chain forming a block of many units. The block polymer produced is useful as an impact modifier for polymethylacrylate.

EXAMPLE 12

In this example, a star type polymer is formed that is useful as a multifunctional viscosity modifier.

A polymerization is run as in example 3 wherein a hydroxy terminated EP is formed. The product is recovered from the polymerization diluent and dried. It is redissolved in dry lubricating oil as a concentrate. A polyfunctional isocyanate (Desmodur R Mobay Chemical) is added with equimolar isocyanate concentration to the dissolved hydroxyl concentration. The EP chains are coupled with formation of star type structure emanating from a central urethane core.

EXAMPLE 13

In this example a star type polymer is formed by alkylating a low molecular weight polystyrene with halogen-terminated EP.

A polymerization is run as in example 1 except that V(acac)$_3$ and Et$_2$AlCl are used as catalyst and co-catalyst.

A solution of I$_2$ in CCl$_4$ is added to terminate the polymerization. The iodine capped chains are recovered and reacted with a low molecular weight polystyrene using AlCl$_3$ as catalyst. A product with many EP grafts onto the polystyrene is formed. The product is useful as a viscosity modifier for lubricating oils.

EXAMPLE 14

In this example a star type polymer is formed by reacting the growing EP chains with a multifunctional epoxide.

A polymerization is carried out as in example 3 except that 1,4,7 triepoxy octave is added at ⅓ the molar amount of growing EP chains. The reaction mixture is reacted for 10 minutes at 40° C. and the polymer is recovered by acid hydrolysis. The product is a structure with EP chains emanating from a central core containing hydroxyl groups. It is useful as a shear-stable multifunctional viscosity modifier.

EXAMPLE 15

The product from Example 11 is blended with polymethylacrylate to form a composition containing 80% polymethylacrylate. The blend contains dispersed ethylene propylene polymer end capped with methylacrylate with an average particle size of 1 micron. The composition has impact strength much improved over polymethylacrylate homopolymer.

EXAMPLE 16

The halogen-terminated product from Example 13 is reacted with styrene monomer using AlCl$_3$ as catalyst. The product is an ethylene propylene block polystyrene polymer containing 30% styrene. This product is blended with polystyrene such that the block polymer comprises 25% of the blend. The impact strength of the polystyrene is increased 300%.

EXAMPLE 17

The product from Example 11 is blended at high temperature with nylon. The end groups of the polyamide (Nylon) react with the ester groups on the ethylene propylene polymer forming an impact modified polyamide (Nylon).

EXAMPLE 18

The halogen-terminated product of Example 13 is reacted with isobutylene using EtAlCl$_2$ as a catalyst. Polyisobutylene blocks are grown on the end of the ethylene propylene polymer. This product is used as a compatabilizer in EPDM-butyl rubber blends wherein particle size of the dispersed EPDM is controlled to be about 1 micron and flex fatigue properties are improved.

EXAMPLE 19

The halogen terminated product from Example 13 is reacted with lithium metal to form a lithiated ethylene propylene polymer. This metalated polymer is reacted with isoprene by an anionic polymerization mechanism. The ethylene propylene-block polyisoprene polymer is employed as a compatibilizer in EPDM-polyisoprene tire sidewall blends. Adhesion to the tire carcass and flex fatigued are improved.

EXAMPLE 20

The product of Example 8 is blended with an equal weight of Paraflow 384. The concentrate remains homogeneous on standing. If ethylene propylene copolymer which had not been grafted onto Paraflow 384 were to be used the concentrate would phase separate.

EXAMPLE 21

The product of Example 7 is blended with polybutadiene to form a portion of a tire carcass. Adhesion to an ethylene propylene tire sidewall is improved.

Although the invention is described with reference to particular means, materials, and processes, the invention is not so limited and extends to all equivalents within the scope of the claims.

What is claimed is:

1. A plurality of ethylene alpha-olefin polymer chains end capped with at least one functional group-containing unit which is otherwise essentially absent from said polymer chains, said plurality of polymer chains having, exclusive of said at least one functional group-containing unit:

at least one of $\overline{M}_w/\overline{M}_n$ less than 2 and $\overline{M}_z/\overline{M}_w$ less than 1.8;

inter-CD such that 95 weight percent of said polymer chains have an ethylene composition that differs from the average weight percent ethylene composition by 15% or less; and intra-CD such that at least two portions of an individual chain, each portion comprising at least 5 percent of the chain, differ from one another by at least 5 weight percent ethylene.

2. The polymer chains as defined by claim 1 wherein said plurality of ethylene alpha-olefin polymer chains are ethylene propylene copolymer chains.

3. The polymer chains as defined by claim 1 wherein said plurality of ethylene alpha-olefin polymer chains are ethylene propylene non-conjugated diene terpolymer chains.

4. The polymer chains as defined in claim 1 wherein said functional group is selected from the group consisting of: —CO$_2$H, —OH, —SH, X, —C—C-benzene, —C—C-(pyridine), —SO$_2$H, SO$_3$H, and mixtures thereof, wherein X is a halide selected from the group consisting of fluorine, chlorine, bromine, and iodine.

5. The polymer chains as defined by claim 1 wherein said functional group is incorporated as a polymer selected from the group consisting of:

the monomers thereof, and mixtures thereof; wherein $R_1$ through $R_4$ are hydrocarbons with 1–30 carbon atoms selected from the group consisting of saturated or unsaturated branched or unbranched, aliphatic, aromatic, cyclic, or polycyclic hydrocarbons, wherein $R_5$ is the same as $R_4$ but may additionally be hydrogen; and wherein $x = 1$–$10,000$.

6. The polymer chains as defined by claim 1 wherein said functional group-containing unit is selected from the group of polymers consisting of: copolymers of ethylene and vinyl acetate; ethylene and acrylic acid esters; vinyl acetate and fumaric acid esters; styrene and maleic acid esters; olefins and maleic acid esters; homoacrylates; and epoxidized natural rubber.

7. The polymer chains as defied by claim 1 wherein said functional group is selected from the group consisting of: isocyanates, urethanes, nitriles, aromatic ethers, and aromatic carbonates.

* * * * *